UNITED STATES PATENT OFFICE.

ORAZIO LUGO, OF NEW YORK, N. Y., ASSIGNOR, BY MESNE ASSIGNMENTS, TO THE MANUFACTURED RUBBER COMPANY, OF CAMDEN, NEW JERSEY.

MANUFACTURE OF RUBBER SUBSTITUTES.

SPECIFICATION forming part of Letters Patent No. 639,927, dated December 26, 1899.

Application filed October 19, 1898. Renewed August 11, 1899. Serial No. 726,941. (No specimens.)

*To all whom it may concern:*

Be it known that I, ORAZIO LUGO, a citizen of the United States, and a resident of the city, county, and State of New York, have invented a new and useful Improvement in the Manufacture and Process of Producing a Rubber Substitute or an Artificial Rubber, of which the following is a specification.

The object of this invention is to produce an article which will be capable of being substituted for and used in connection or admixture with rubber.

The invention consists, essentially, in the process of mixing oil with sulfur, heating the mixture, and then subjecting the mixture to hydrosaponification. Linseed-oil is an example of a suitable vegetable oil.

The invention consists, further, in various steps in conjunction with those mentioned, whereby the object of the invention is attained.

In carrying out my process I first produce sulfurized oil. To do this, I may mix with a vegetable oil about ten per cent. of sulfur, and then subject the mixture to heating and agitation until a solid mass results. By using a larger quantity of sulfur the time required is reduced. I have found that a temperature of 320° Fahrenheit will produce the best results. To make this compound satisfactory as a rubber substitute, it is necessary to eliminate the glyceril from the glycerid. To accomplish this, the solid or viscous mass (sulfurized oil) has added to it a quantity of water, and then the mixture is heated in a closed vessel to a temperature of approximately 320° Fahrenheit until the mixture becomes liquid. The liquid is then freed from water and the resultant product is capable of various uses, such as for coatings for metals to prevent oxidation and for other uses. The glycerid in the mixture under this treatment becomes decomposed and the sulfur enters into combination with the radical of the oil, producing a chemical compound of sulfur and the acid of the oil. The glycerin becomes a waste product and is removed from the compound by water.

In order to convert the liquid into a substance corresponding in qualities to and capable of mixing with rubber, I add to it ten per cent., more or less, of sulfur and heat the mixture to about 320° Fahrenheit, and at the same time agitate it until a plastic mass is produced. The resulting product is elastic, plastic, and corresponds in its qualities to virgin india-rubber.

To produce a harder product than that obtained as above set forth, the combination is again submitted to hydrosaponification until it becomes semiliquid, and then when freed from water has added to it a quantity of sulfur—say five per cent. The combination of the sulfur with the compound is effected while subjecting the mixture to heating and agitation. The product obtained when all the steps described are carried out possesses the desirable qualities of india-rubber.

Having thus described my invention, what I claim as new, and desire to secure by Letters Patent, is—

1. The process of producing a rubber substitute which consists in subjecting sulfurized oil to hydrosaponification, substantially as described.

2. The process of producing a rubber substitute which consists in subjecting sulfurized oil to hydrosaponification, and then heating the mass.

3. The process of producing a rubber substitute which consists in subjecting sulfurized oil to hydrosaponification, adding sulfur, and then heating the mass.

4. The process of producing a rubber substitute which consists in subjecting sulfurized oil to hydrosaponification, adding sulfur to the mass, heating the mass, washing the mass with water, adding sulfur to the washed mass and heating and agitating the mass, substantially as described.

5. The process of producing a rubber substitute which consists in mixing a vegetable oil with sulfur, heating the mixture, and then in subjecting the mixture to hydrosaponification, substantially as described.

6. The process of producing a rubber substitute which consists in mixing a vegetable oil and sulfur, heating and agitating the mixture until a solid mass is produced, and then in heating the mass in a closed vessel in the presence of water, substantially as described.

7. The process of producing a rubber substitute which consists in mixing a vegetable oil and sulfur, heating the mixture, then subjecting the mixture to heat in the presence of water, until it becomes liquid, then dehydrating the liquid vulcanite and subsequently adding sulfur, and heating the mixture, substantially as described.

8. The process of producing a rubber substitute which consists in mixing a vegetable oil and sulfur, heating the mixture, then subjecting the mixture to heat in the presence of water until it becomes liquid, then dehydrating the liquid vulcanite, and subsequently adding sulfur and again heating the mixture, submitting the same to hydro-saponification, and then adding sulfur, substantially as described.

9. The process of producing a rubber substitute which consists in mixing a vegetable oil and sulfur, heating the mixture, then subjecting the mixture to hydrosaponification until it becomes liquid, then dehydrating the liquid vulcanite, next adding sulfur, again heating the mixture, submitting the mixture to hydrosaponification, then adding sulfur and finally heating the mixture, substantially as described.

10. The process of producing a rubber substitute which consists in subjecting oil to sulfurization and to hydrosaponification.

Signed at New York, in the county of New York and State of New York, this 12th day of October, A. D. 1898.

ORAZIO LUGO.

Witnesses:
  EDWIN OLIVER,
  ROBT. E. RANDALL.